Nov. 8, 1966     D. E. WERNZ ETAL     3,284,607

BRAZING METHOD AND APPARATUS

Filed Sept. 9, 1959     2 Sheets-Sheet 2

INVENTORS.
DONALD E. WERNZ
HARRIS M. DOLAN
JOSEPH A. GAYDOS

Arthur M. King
AGENT

United States Patent Office 3,284,607
Patented Nov. 8, 1966

3,284,607
BRAZING METHOD AND APPARATUS
Donald E. Wernz, Baltimore County, Md.; Georgia N. Wernz, executrix of Donald E. Wernz, deceased; Harris M. Dolan, Glen Arm, and Joseph A. Gaydos, Baltimore, Md., assignors to Martin-Marietta Corporation, a corporation of Maryland
Filed Sept. 9, 1959, Ser. No. 838,887
6 Claims. (Cl. 219—85)

Large furnaces have been necessitated according to prior art brazing processes in the event the components to be brazed are sizeable, with the result that brazed honeycomb panels have been exceedingly expensive, sometimes costing more than $100 per square foot. Conventionally, an upper and lower form block, accurately contoured to match the respective surfaces of the part to be brazed, are employed to hold the contour of the assembly within desired limits, and prevent distortion of the assembly during the brazing operation. The form blocks are usually made of graphite because of its desirable high heat conductivity. Additional weight may be placed upon the upper block, so as to keep the loading on the assembly at least 1 pound per square inch. The assembly to be brazed and associated forming apparatus are then placed in a retort box provided with an inert atmosphere. A metal cover welded to the top of the box contains the inert atmosphere. The retort box, after being positioned in a furnace is then brought to temperature so as to cause the core and metal skins to braze. When brazing has been completed, the retort box is cooled and the cover cut off to permit removal of the bonded core panel.

Furnace brazing as described above is subject to several undesirable limitations. Furnaces are necessarily large in order to be able to accommodate the work pieces. They are slow to heat and cool, because heating of the assembly to be brazed depends largely upon air convection and radiation, which is less efficient than conduction heating. Moreover, contoured form blocks are expensive and sometimes cause rippling and buckling in the surface of the assembly being brazed, which results from uneven distribution of the bonding pressure over the panel surface. This problem arises when one or more high points have developed on a form block, so that the full load exerted by the block is transmitted to the assembly over only a relatively small portion of its surface.

Therefore, it is a purpose of this invention to provide an electrothermal method of brazing metal skins to metal honeycomb core which obviates to a large extent the above-mentioned limitations of furnace brazing. Heating of the assembly to be joined is accomplished primarily by conduction, with the assembly in compressive relation to the thermal source so that brazing is effected in a rapid and efficient manner. Means are also provided for distributing bonding pressure uniformly over the surface of the assembly, and at the same time reducing the number of contoured forms required from two to one.

In accordance with the present invention, advantage is taken of the efficiency of electrical heating in performing high temperature brazing operations. Resistive elements, acting in cooperation with a contoured press, are brought into thermal conductive contact with the assembly to be brazed so that a direct and uniform transfer of the resistive heat is made. An expandable gas-filled metal bag disposed between the assembled parts and the press is used to provide a controlled evenly distributed pressure. The bag readily conforms to the contour of the surface against which it is placed, with the gas contained therein exerting a constant pressure over the entire contact area between the bag and the assembly to be brazed.

Before bonding, suitable brazing material is placed between the metal honeycomb core and the metal skins. Any metals which can be brazed together may be utilized for the honeycomb panel structure. The only limitation to this method is the temperature attainable with the particular resistive material. Electrical heating elements are available which produce temperatures up to about 2200° F., well above that required for most brazing operations. The silver alloys, 92.5 Ag-7.5 Cu, 85 Ag-15 Mn, 90 Ag-10 Cu, for example, commonly used in bonding stainless steel, melt below 1800° F.

Other structural metals and alloys such as titanium, inconel and molybdenum are suitable for honeycomb panel construction, the choice of material being determined by the intended function of the panel and expected operating conditions.

In order to impart a better understanding of the present method, reference is made to a particular apparatus for its practice and also to the drawings in which.

Figure 1:
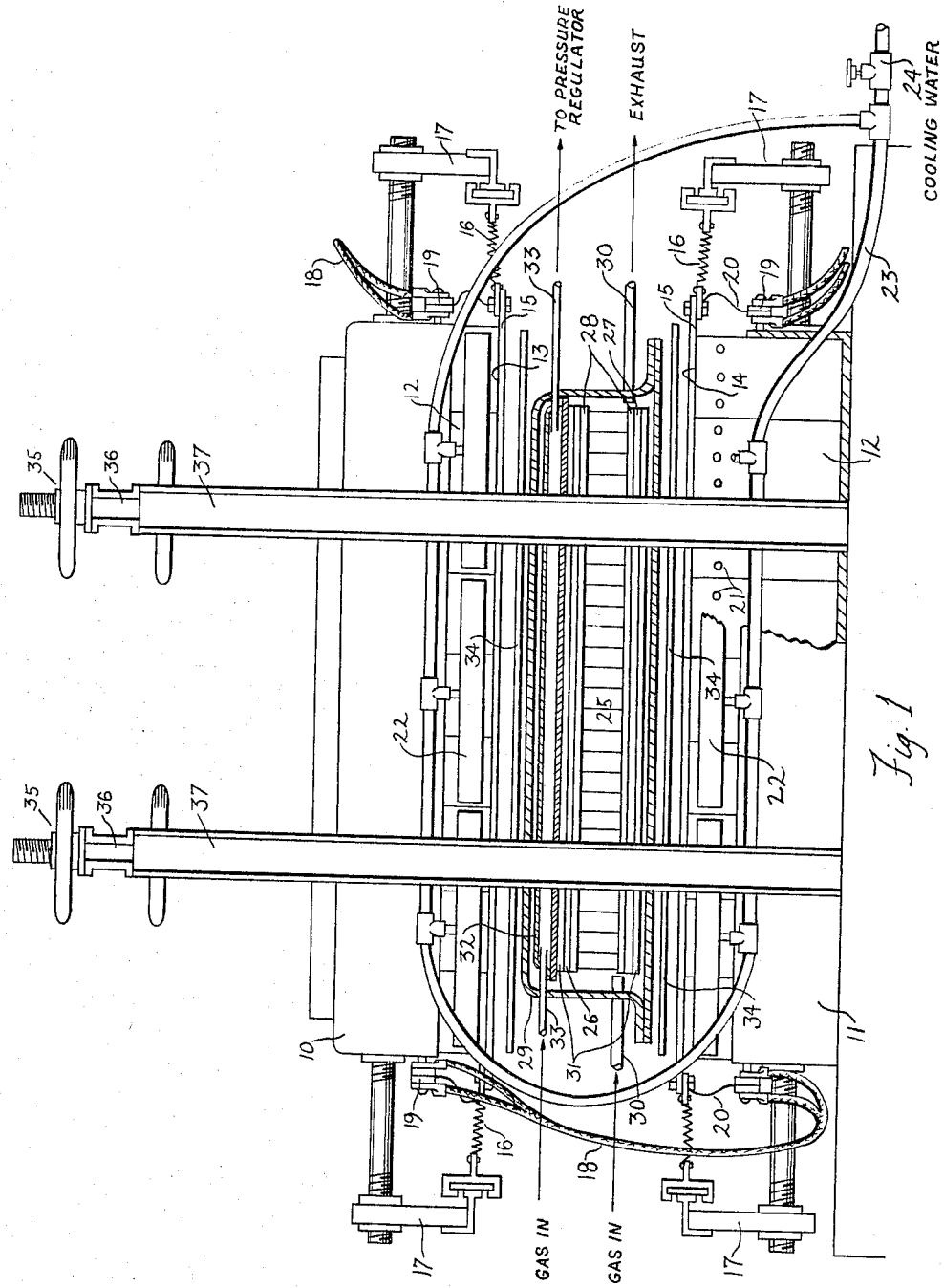
FIGURE 1 is a side elevation of an exemplary resistance brazing fixture according to this invention, with the upper and lower housings of the fixture separated to reveal in a somewhat exploded relation a typical arrangement of components to be brazed.

Referring first to FIGURE 1, an upper housing 10 and lower housing 11 contain fire brick 12 arranged so as to present respective opposing surfaces 13 and 14 over which are stretched a comparatively large number of strip heaters 15, such as of nichrome. Strips 15 approximately 0.010 inch thick and 1.0 inch wide, are maintained under constant tension by springs 16 connected to electrically insulated adjustable arms 17. In addition to positioning strips 15, spring 16 also serve to compensate for any thermal expansion during the brazing process. Low voltage-high amperage current is supplied to strips 15 by electrical lines 18 connected to bus bars 19. Bars 19 are tapped at spaced intervals by leads 20 which deliver power to individual strips 15.

Holes drilled in fire brick 12 receive cooling water tubes 21, which are fed through coolant manifolds 22. Water is used after brazing is completed to effect rapid cooling of fire brick 12 and the parts which have been brazed. Water delivered to manifolds 22 by means of hoses 23, flows through fire brick 12, and passes into a similar manifold system on the opposite side of the fixture from whence it is discharged. Valve 24 controls the rate of flow of coolant water in hoses 23.

A typical assembly to be brazed, consists of a honeycomb core 25 and upper and lower metal skins, 26 and 27, respectively, separated by layers of brazing filler 28. In order to prevent oxidation of the assembly during the brazing operation, it is placed in an expandable metal envelope 29, preferably of stainless steel and having a thickness of 5 to 10 mils. Envelope 29 is sealed against the atmosphere. Tubes 30 communicating with the interior of envelope 29 are used to evacuate air therefrom and to substitute an inert gas, such as argon. Alternately, only one tube 30 need be used if it is desired to maintain a vacuum in envelope 29, the tube being connected to a vacuum pump.

Heavy flexible buffer sheets 31 of stainless steel or other suitable metal placed between skins 26, 27 and envelope 29, are designed to conform to the desired contour of the assembly being brazed. At the same time, buffer sheets 31 are rigid enough to withstand any distorting forces that arise during the brazing operation, so that they present constantly smooth surfaces which tend to flatten out rippling or buckling in skins 26 and 27. For this purpose stainless steel sheet 0.09 inch thick has been found to work very satisfactorily.

Disposed between envelope 29 and upper buffer sheet 31 is an expandable metal bag 32 provided with gas inlet and outlet tubes 33. Bag 32 is designed to transmit a predetermined pressure uniformly to the upper surface of skin 26. For this purpose, bag 32 is filled with a gas, preferably an inert gas such as nitrogen or argon. Any force exerted on bag 32 by brick surface 13 will be evenly distributed over skin 26. Depending upon what bonding pressure is required, the pressure of the gas in bag 32 is maintained at a predetermined level during the brazing operation to insure intimate contact between the components to be joined. This may be accomplished by means of a conventional gas pressure regulator (not shown), in line with outlet tube 33 which is led through a gas tight seal in envelope 29 so that attachment may be made to the pressure regulator system. The other or inlet tube 33 is connected to a gas reservoir (not shown) which supplies gas to bag 32.

In common practice, a gauge pressure of about 1 p.s.i. in bag 32 is satisfactory, although other pressures may be used. The bag is made of stainless steel or other suitable metal alloy having a thickness of about 0.005 to 0.010 inch. During the brazing operation, upper housing 10 is kept stationary, so that brick surface 13 serves to back up the pressure exerted by the gas in bag 32.

Bag 32 eliminates the need for matched press faces. It is only necessary that one of the working surfaces of the brazing fixture be accurately contoured to the desired panel shape. In the drawings, the working surface of the fire brick 12 in lower housing 11 represents an accurately contoured face 14, the opposite working surface representing a roughly formed face 13. Regardless of the degree of tolerance provided in the upper face, skin 26 will experience only a uniform downward pressure over its entire surface, and, consequently, the honeycomb assembly will be forced evenly against the accurate lower face 14. In this manner the occurrence of rippling and buckling in skins 26 and 27, formerly resulting from irregularities in bonding pressures, are eliminated.

Electrical insulation is provided for strips 15 in the form of a layer 34 of high-temperature dielectric such as silica cloth. A commercially available product known as Refrasil has been used for this purpose with a high degree of success. Upper housing 10 is vertically adjustable by means of screw jacks 35, so that it may be brought to bear down on envelope 29 and contents to assure a close fit of the components to be brazed, and to bring strips 15 and envelope 29 into compressive relation. Screw jacks 35 operating on cross beams 36 are supported by upright beams 37.

Figure 2:
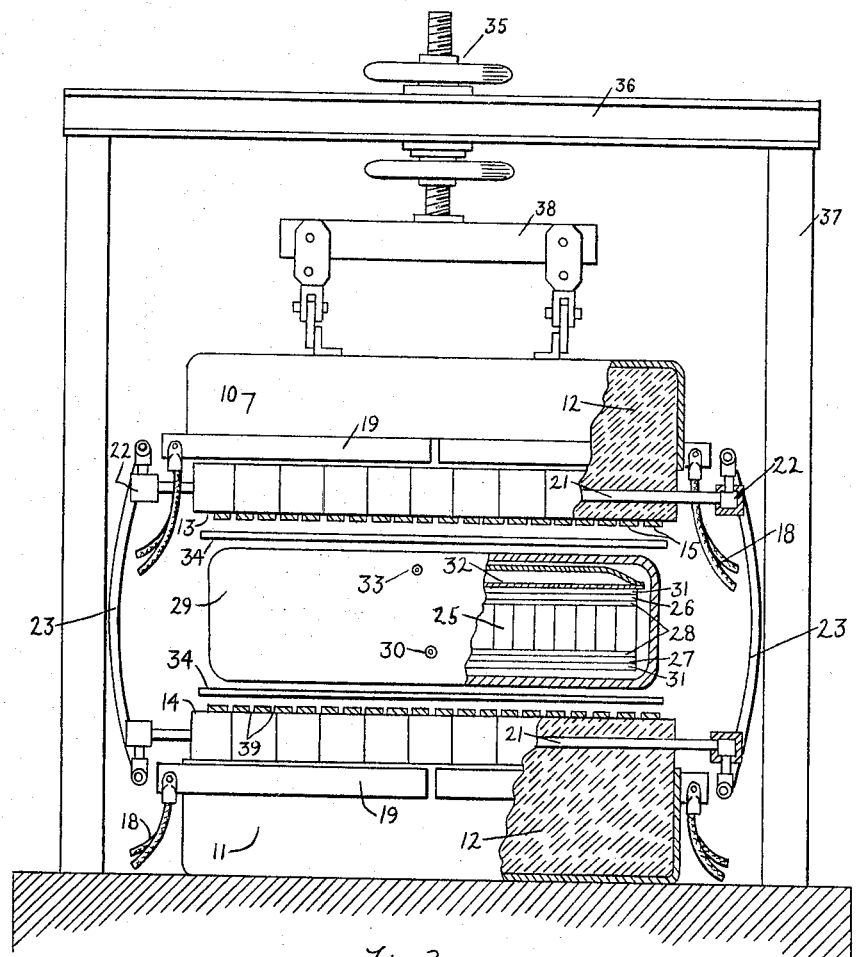
FIGURE 2 is an end elevation of the fixture of FIGURE 1, partly in section.

These and other features of the brazing fixture are better seen in FIGURE 2. Screw jacks 35, one of which is shown in this figure, are connected to upper housing 10 by means of supports 38. Housings 10 and 11 are cut away to show the array of fire brick 12 therein and cooling tubes 21 connected to manifolds 22. Heating strips 15 are arranged in closely spaced relation, about 1/16" apart, on the opposing surfaces 13 and 14 of fire brick 12 contained in housings 10 and 11, and are mutually insulated by air gaps 39 therebetween. Because low voltage current is used, air gaps 39 may be relatively small, and can be made even smaller by placing insulation 34 around strips 15 in the manner of a sleeve, rather than over the strips as a sheet.

As an example of the present method, the assembly to be brazed consisting of core 25, brazing alloy 28, skins 26 and 27 and upper and lower buffer sheets 31 is inserted through an open end of a metallic envelope 29. Pressure bag 32 is placed over upper buffer sheet 31 with outlet tubes 33 extending through envelope 29. The envelope is then welded closed or otherwise sealed against the atmosphere, positioned on the lower set of heating elements 15, and purged of air by introducing, for example, an argon atmosphere through one of tubes 30, the discharged gas flowing out of the other tube. Upper housing 10 is lowered by means of screw jacks 35 to a predetermined height above envelope 29 so that, upon inflation, bag 32 will come into compressive contact with the upper working surface 13. Gas, for example, argon gas, is introduced into bag 32 causing it to expand and press downwardly against upper buffer sheet 31, so that skin 26 and the other panel components are subjected to a constant evenly distributed compressive force.

Power is then turned on to heater strips 15, which, in turn, bring the assembly up to temperature. For brazing stainless steel honeycomb core to stainless steel skins, a power distribution of approximately 1500 watts per square foot over each of the top and bottom heating sections has been found satisfactory. Of course, the amount of power required to heat the assembly will depend upon the thermal characteristics and dimensions of the parts to be brazed, on ambient temperature, type of brazing material used and other factors, but in any event heating is accomplished far more rapidly than is possible by the use of a furnace. An indication of the rate of heating and of the temperature pattern of the assembly to be brazed is obtained by placing a number of thermocouples at various locations on the assembly in envelope 29. When the parts have come to the temperature required for melting the particular brazing compound used, this condition is held for a predetermined interval of time to insure adequate wetting of the bonding surfaces. Temperature control is effected by varying electric power in the heating elements.

When brazing has been completed, power is turned off, and valve 24 is opened to supply cooling water to fire brick 12 while the assembly remains under compression. In this manner, cooling may be rapidly accomplished without warping occurring in any of the components that have been bonded. After cooling, upper housing 10 is raised, one end of the envelope opened, and the brazed honeycomb panel removed.

Although a preferred embodiment of the present invention has been disclosed, it will be understood that modifications may be made within the spirit and scope of the appended claims. For example, skins 26 and 27 may be made oversized so that they extend beyond the sides of core 25. The skins are then welded together or otherwise sealed with one or two tubes extending into the space between the skins, which, as before, are used to provide an inert atmosphere or a vacuum, respectively, for brazing of the honeycomb panel. Buffer sheets 31 and bag 32 are set in place as before, and the assembly is brazed in accordance with the method steps described previously.

We claim:

1. An electrothermal fixture for brazing metal honeycomb core panel comprising upper and lower sections of refractory material having opposed contoured faces between which parts to be brazed are positioned, a plurality of electrical heating elements disposed on said surfaces, spring means to maintain said elements under tension, actuating means for lowering said upper section and bringing said heating elements and said parts to be brazed into compressive relation, electric power means connected to said heating elements for heating said elements to the required brazing temperature, and cooling means in said upper and lower sections adjacent said opposed faces for cooling said parts after brazing.

2. An apparatus for brazing honeycomb panels comprising upper and lower sections of refractory material having opposed surfaces, one of said surfaces being accurately contoured to a predetermined shape, a plurality of electrical heating elements disposed in spaced relation on said surfaces, an expansible metal envelope adapted to receive parts to be brazed and to fit between said upper and lower sections, means for controlling the nature of the atmosphere in said envelope, a pneumatically expansible cushion adapted to be positioned in said envelope on that surface of said parts remote from said contoured surface in compressive relation to the parts to be brazed, means for bringing said upper and lower sections to bear upon said envelope and its contents, and means for pressurizing said expansible cushion with fluid so as to force said parts uniformly against said contoured face.

3. The method of brazing metal skins to metal honeycomb core comprising the steps of positioning a core of metal honeycomb between two metal skins with brazing material between said skins and said core, so as to form a panel assembly, placing a pneumatically expansible cushion upon said assembly, placing said assembly and expansible cushion within an expansible metal envelope having a non-oxidizing atmosphere, positioning said envelope between two surfaces at least one of which constitutes a contoured form, compressing the panel assembly against said contoured form by applying fluid pressure to said expansible cushion, and heating said assembly with electrical heating elements disposed on both sides of said envelope.

4. An electrothermal fixture for brazing metal honeycomb core panel comprising upper and lower sections of refractory material having opposed contoured surfaces between which parts to be brazed are positioned, a plurality of electrical heating elements disposed on said surfaces, means to maintain said elements under tension, actuating means for lowering said upper section and bringing said heating elements and said parts to be brazed into compressive relation, and electric power means connected to said heating elements for heating said elements to the required brazing temperature.

5. The method of brazing metal skins to metal honeycomb core comprising the steps of positioning a core of metal honeycomb between said skins and said core, so as to form a panel assembly, placing a fluidically expansible cushion upon said assembly, placing said assembly and said expansible cushion within an expansible metal envelope having a nonoxidizing atmosphere, positioning said envelope between two surfaces at least one of which is accurately configured, compressing said panel assembly by applying fluid pressure to said expansible cushion, and heating said assembly with electrical heating elements disposed on both sides of said envelope.

6. An apparatus for brazing honeycomb panels comprising upper and lower sections of refractory material having opposed surfaces, at least one of which being accurately configured to a predetermined shape, a plurality of electrical heating elements disposed in spaced relation on said surfaces, a thin metal envelope adapted to receive parts to be brazed and to be positioned between said heating elements disposed on each of said surfaces, means for controlling the nature of the atmosphere in said envelope, a fluidically expansible cushion adapted to be positioned in said envelope on that surface of said parts remote from said at least one accurately configured surface in compressive relation to the parts to be brazed, means for bringing said upper and lower sections to bear upon said envelope and its contents, means for pressurizing said expansible cushion with fluid so as to force said parts uniformly against said at least one accurately configured surface, and electric power means connected to said heating elements for heating said elements to the required brazing temperature.

References Cited by the Examiner

UNITED STATES PATENTS

| | | | |
|---|---|---|---|
| 224,612 | 2/1880 | Sawyer | 219—50 |
| 533,795 | 2/1895 | Edwards | 219—524 |
| 853,351 | 5/1907 | Fulton | 219—85 |
| 916,140 | 3/1909 | Fulton | 219—85 |
| 2,022,795 | 12/1935 | Vehko | 219—85 |
| 2,084,268 | 6/1937 | Quarnstron | 219—85 |
| 2,693,636 | 11/1954 | Simpelaar | 219—85 X |
| 2,984,732 | 5/1961 | Herbert | 219—78 |
| 3,071,853 | 1/1963 | Price et al. | 29—471.1 |

JOSEPH V. TRUHE, *Primary Examiner.*

MAX L. LEVY, *Examiner.*

RICHARD M. WOOD, *Assistant Examiner.*

UNITED STATES PATENT OFFICE

CERTIFICATE OF CORRECTION

Patent No. 3,284,607                                November 8, 1966

Donald E. Wernz, deceased, by Georgia N. Wernz, executrix, et al.

It is hereby certified that error appears in the above numbered patent requiring correction and that the said Letters Patent should read as corrected below.

Column 1, before line 10, insert the following:

This invention relates to the manufacture of structural honeycomb core panels and more particularly to an improved method for the brazing of honeycomb core panels made of high temperature material such as heat-treatable alloys, and to an electric brazing fixture for carrying out this method.

This application is a continuation-in-part of copending application Serial Number 756,712 filed August 22, 1958, entitled "BRAZING METHOD AND APPARATUS" by Wernz et al., now abandoned.

Signed and sealed this 5th day of September 1967.

(SEAL)
Attest:

ERNEST W. SWIDER                              EDWARD J. BRENNER
Attesting Officer                           Commissioner of Patents